United States Patent [19]

Angus et al.

[11] Patent Number: 5,009,679
[45] Date of Patent: Apr. 23, 1991

[54] MEMBRANES FORMED FROM RIGID AROMATIC POLYIMIDE POLYMERS

[75] Inventors: Richard O. Angus; Kahlil Yacoub, both of Allentown, Pa.

[73] Assignee: Air Products and Chemicals, Inc., Allentown, Pa.

[21] Appl. No.: 529,078

[22] Filed: May 25, 1990

[51] Int. Cl.$^5$ .................. B01D 53/22; B01D 71/64
[52] U.S. Cl. ............................ 55/16; 55/68; 55/158; 528/329.1
[58] Field of Search ..................... 55/16, 68, 158; 210/500.39; 528/310, 329.1

[56] References Cited

U.S. PATENT DOCUMENTS

| | | | |
|---|---|---|---|
| Re. 30,351 | 7/1980 | Hoehn et al. | 55/16 |
| 3,822,202 | 7/1974 | Hoehn | 210/23 |
| 3,899,309 | 8/1975 | Hoehn et al. | 55/16 |
| 4,378,400 | 3/1983 | Makino et al. | 428/220 |
| 4,528,004 | 7/1985 | Makino et al. | 55/16 X |
| 4,701,187 | 10/1987 | Choe et al. | 55/16 |
| 4,705,540 | 11/1987 | Hayes | 55/16 |
| 4,717,393 | 1/1988 | Hayes | 55/16 |
| 4,717,394 | 1/1988 | Hayes | 55/16 |
| 4,908,134 | 3/1990 | Anderson | 210/500.39 X |
| 4,931,182 | 6/1990 | Burgoyne, Jr. et al. | 210/500.39 |
| 4,932,982 | 6/1990 | Hayes | 55/158 X |
| 4,932,983 | 6/1990 | Hayes | 55/158 X |
| 4,952,220 | 8/1990 | Langsam et al. | 210/500.39 X |
| 4,954,144 | 9/1990 | Burgoyne, Jr. et al. | 55/158 X |

FOREIGN PATENT DOCUMENTS 63-190607  8/1988  Japan.
63-278524 11/1988  Japan.

OTHER PUBLICATIONS

Kim et al., "Reverse Permselectivity, of $N_2$ over $CH_4$ in Aromatic Polyimides", J. Appl. Poly. Sci., vol. 34, (1987), pp. 1767–1771.
Salame, "Prediction of Gas Barrier Properties of High Polymers", Polymer Eng. & Sci., vol. 26, (1986), pp. 1543–1546, No. 22.

Primary Examiner—Robert Spitzer
Attorney, Agent, or Firm—Keith D. Gourley; James C. Simmons; William F. Marsh

[57] ABSTRACT

The present invention is a class of semi-permeable polymeric membranes and processes for using such membranes to separate one or more components of a gas mixture. The membranes are formed from aromatic polyimides derived from reaction of a 9,9-bis-(3,4-dicarboxyphenyl)-fluorene dianhydride and at least one aromatic diamine. These polyimide membranes exhibit high gas perm-selectivities and are especially useful in effecting the separation of oxygen and nitrogen from air.

24 Claims, No Drawings

MEMBRANES FORMED FROM RIGID AROMATIC POLYIMIDE POLYMERS

TECHNICAL FIELD OF THE INVENTION

The present invention relates to polymeric membranes which are useful in gas separation operations.

BACKGROUND OF THE INVENTION

A need exists in the art for improved polymeric materials that are highly permeable, yet which under certain circumstances, provide selective separation of the components of various gaseous mixtures. Such materials would be especially useful in commercial, non-cryogenic gas separation processes.

Commercial applications utilizing separation devices based on polymeric materials rely, in part, on maximizing the overall gas flux through the membrane. P. H. Kim, et al., J. Appl. Poly. Sci., 34 1761 (1987), reports that the gas flux for a membrane is related to the average space between the polymer chains. In addition, the reference states that overall gas flux is related to the density of the polymer. The success of potential commercial applications depends on the identification of polymers which possess very high flux and good thermo-mechanical properties.

Polymers exhibiting high overall gas flux typically possess low chain-chain interactions as is the case with polymers such as poly(dimethylsiloxane) and poly(4-methyl-1-pentene). Due to low chain-chain interactions, these high flux materials have low glass transition temperatures (Tg). Consequently, these materials require special processing conditions to build in chemical and physiochemical crosslinking if they are to be used in high temperature applications. In contrast, polymers having strong chain-chain interactions typically possess rather high Tg values and usually exhibit rather low gas flux.

U.S. Pat. Nos. 3,822,202 and 3,899,309; Re 30,351 (1980), disclose a process for separating fluids using a semi-permeable membrane made from polyimides, polyesters or polyamides. The repeating units of the main polymer chain of these membranes have at least one rigid divalent subunit, the two main chain single bonds extending therefrom which are not colinear wherein at least one of the subunits is sterically unable to rotate 360° around such bond. The repeating units also have 50% or more of its main chain atoms as members of aromatic rings.

U.S. Pat. Nos. 4,705,540 discloses highly permeable aromatic polyimide gas separation membranes and processes for using such membranes. The membranes comprise an aromatic polyimide in which the phenylenediamine groups are rigid and are substituted on essentially all of the positions ortho to the amine functionality and the acid anhydride groups are essentially all attached to rigid aromatic moieties.

U.S. Pat. Nos. 4,717,393 and 4,717,394 disclose polymeric membranes and processes using such membranes for separating components of a gas mixture. The membranes are semi-flexible, aromatic polyimides, prepared by polycondensation of dianhydrides with phenylenediamines having alkyl substituents on all positions ortho to the amine functionality, or with mixtures of other non-alkylated diamines, some components having substituents on all positions ortho to the amine functionality. The membranes formed from this class of polyimides are stated to exhibit improved environmental stability and gas permeability.

U.S. Pat. No. 4,378,400 discloses gas separation membranes formed from aromatic polyimides based upon biphenyltatracarboxylic dianhydride for separating various gas mixtures. Japanese Patent Applications Nos. 1-194904 and 1-194905 disclose gas separation membranes formed from various polyarylates and polyimides, respectively.

Japanese Patent Applications Nos. 63-190507 and 63-278524 disclose gas separation membranes formed from polyamides characterized as having hydrogen atoms on all ring positions ortho to an aromatic amine functionality or, alternatively, as having a maximum of only one alkyl group located on a position ortho to each amine functionality. Additionally, the teachings of both applications are limited to ortho-alkylated compounds wherein the alkyl group is either methyl or ethyl.

M. Salame, Poly. Eng. Sci., 26 1543 (1986), reports a predictive relationship between oxygen permeability coefficient [(PO$_2$)] and polymer structure wherein the group contributions of various structural portions of a polymer are equated to P(O$_2$) values. The presence of an aromatic group, such as phenyl, in place of a methylene (—CH$_2$—) group is stated to decrease the P(O$_2$) values for a pair of comparative polymers.

BRIEF SUMMARY OF THE INVENTION

The present invention relates to a class of semi-permeable membranes and processes for using such membranes to separate one or more components of a gas mixture. The membranes of the present invention are formed from aromatic polyimides derived from the reaction of a 9,9-bis-(3,4-dicarboxyphenyl) fluorene dianhydride and at least one aromatic diamine. The subject membranes exhibit high gas perm-selectivity and are useful in gas separation applications, especially in the separation of oxygen and nitrogen from air.

DETAILED DESCRIPTION OF THE INVENTION

The present invention is a class of semi-permeable polymeric membranes which exhibit high selectivity in gas separation applications, especially in the separation of oxygen from air. The membranes of the present invention are derived from polymers formed from the polymerization of a 9,9-bis-(3,4-dicarboxyphenyl) fluorene dianhydride derivative, hereinafter referred to as fl-DA, and at least one aromatic diamine. The use of various fl-DA derivatives to form the subject polyimide polymers provides a novel class of polyimide membranes. The polyimides from which these membranes are formed are derived from an fl-DA derivative represented by the formula:

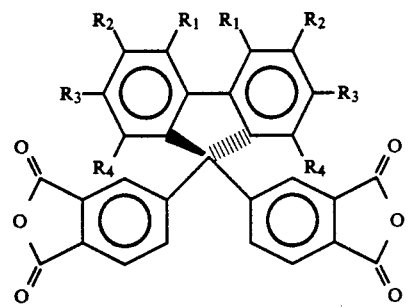

wherein $R_1$ through $R_4$, inclusive, are independently selected from a hydrogen atom, a linear or branched alkyl, alkenyl or alkoxy group having from 1 to about 8 carbon atoms, cyano or $R_1$ and $R_1$, $R_1$ and $R_2$, $R_2$ and $R_3$, and $R_3$ and $R_4$ may together form part of cyclohydrocarbyl ring
and at least one aromatic diamine represented by the formulae:

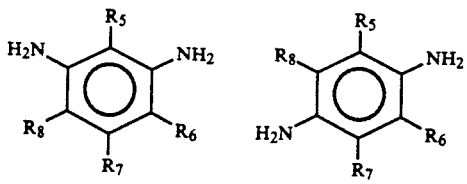

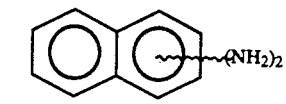

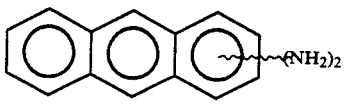

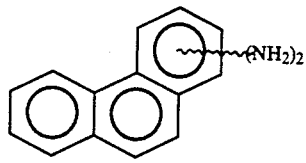

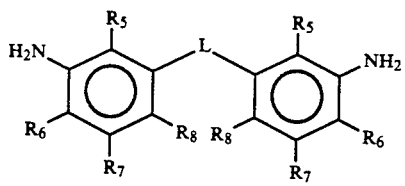

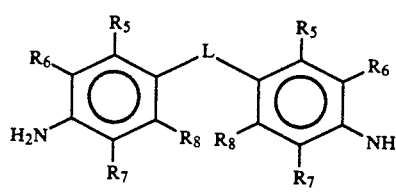

wherein $R_5$ through $R_8$, inclusive, are independently selected from a hydrogen atom or a linear or branched alkyl, alkenyl or alkoxy group having from 1 to about 8 carbon atoms, each of which can optionally be partially or fully fluorinated; and L is a linear or branched alkylene, alkenylene, phenylene or alkylphenylene group having from 1 to about 8 carbon atoms, each of which can optionally be partially or fully fluorinated.

The polyimides of the present invention can be prepared by a condensation polymerization method utilizing a 1:1 mole ratio of diamine to dianhydride. Copolymers prepared from a mixture of two or more aromatic diamines can be prepared providing that the above-mentioned stoichiometry is maintained.

In a preferred embodiment, $R_5$ through $R_8$, inclusive, are independently selected from a hydrogen atom or a linear or branched alkyl group having from 1 to about 8 carbon atoms, each of which can optionally be partially or fully fluorinated and L is selected from a linear or branched alkylene group having from 1 to about 6 carbon atoms, each of which can optionally be partially or fully fluorinated.

In addition to the above-mentioned polyimide structures, minor amounts of other monomers may be incorporated into the polymer so long as such monomers do not affect the gas separation properties of the resultant membranes. The polyimides of the present invention can be used to form membranes in any desired configuration known in the art including dense films, flat sheets, hollow fibers and the like.

Polymeric films made from the subject polyimide polymers are soluble in a wide range of common organic solvents including, but not limited to, 1,2-dichloroethane, dimethylformamide and dimethylacetamide. From these solvents, tough, transparent films suitable for gas separation can be cast or otherwise formed according to methods well known in the art.

As stated above, the polyimide membranes of the present invention are useful in a variety of gas separation applications, especially for nitrogen/oxygen separations. The gas mixture to be separated is simply brought into contact with the membrane whereby one or more components selectively permeates through the membrane.

The following examples are presented to better illustrate the present invention and are not meant to be limiting.

EXAMPLE Preparation of fl-DA/DDA Polyimide

Thin film polyamide membranes were made in accordance with the procedure set out below wherein the following synthetic scheme was utilized.

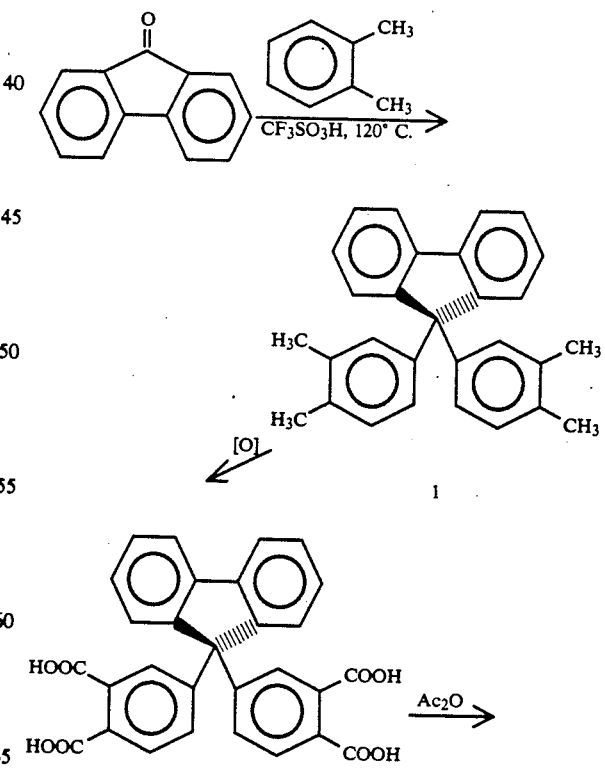

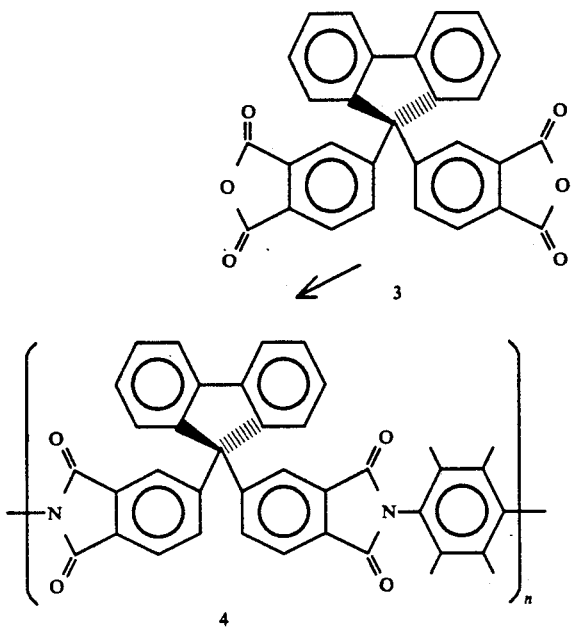

Preparation of 9,9-Bis-(3,4-dimethylphenyl)fluorene (1)

A three liter round-bottom flask fitted with a reflux condenser and a gas inlet was charged with 9-fluorenone (36.6 g, 201 mmol) and excess ortho-xylene (710 ml) and stirred under nitrogen atmosphere. Trifluoromethanesulfonic acid (30.0 g, 201 mmol) was slowly added to the solution causing the solution to turn brown/black. The reaction mixture was warmed to 120+/−2° C. for 2 days. A small sample of the reaction mixture (0.5 mol) was removed, neutralized with saturated aqueous NaHCO₃ and the organic layer was spotted on a silica TLC plate and eluted with hexanes. Chromatographic results demonstrated complete conversion of the starting materials and the development of a new single fluorescing spot. The entire reaction mixture was neutralized with saturated aqueous NaHCO₃, diluted with ethyl acetate (730 ml) decolorized with activated carbon, dried with magnesium sulfate and concentrated to a pale yellow powder. The product was triturated with ethanol and ethyl acetate to afford 50 g (66%) of crude beige product, mp 168°–70° C., which was sufficiently pure for the next step. IR (KBr) 3065w, 3042w, 3020w, 2970w, 2960s, 2945w, 2880vw, 1610vw, 1502m, 1475w, 1448s, 1384w, 1022w, 827w, 812w, 742 +/−2 cm⁻¹.

Preparation of 9,9-Bis-(3,4-dicarboxyphenyl) fluorene (2)

To a 500 ml round-bottom flask equipped with a mechanical stirrer, reflux condenser and a gas inlet, was added 9,9-bis-(3,4-dimethylphenyl)fluorene (1) (20.1 g, 53.7 mmol). Co(OAc)₂·4H₂O (1.07 g, 4.29 mmol), Mn(OAc)₂·4H₂O (1.05 g, 4.29 mmol), NaBr (536 mg, 5.20 mmol) and propionic acid (200 ml). Air was bubbled into the slurry at a rate of 0.2–0.5 L/min. The mix was stirred vigorously and warmed to 132°+/−2° C. for 2 days. TLC analysis of a small sample of of the reaction mixture after neutralization and dilution with ethyl acetate showed the absence of starting material. Propionic acid was removed from the mixture at reduced pressure leaving a blue/white solid crude product in the flask which was sufficiently pure for the next synthetic step.

Preparation of 9,9-Bis-(3,4-dicarboxyphenyl)fluorene dianhydride (fl-DA) (3)

The crude reaction mixture of 9,9-bis-(3,4-dicarboxyphenyl)fluorene (2) was heated to 150°+/−5° C. at 0.5+/−0.5 torr for 1 day. Infrared analysis of the crude reaction product was consistent with the dianhydride structure. The crude material was multiply recrystallized from toluene to afford a white powder, mp 267°–69° C. IR (KBr) 3060w, 1890s, 1775s,1615w, 1445w, 1255s, 1108w, 895m, 733m, 688m +/−5 cm⁻¹.

Preparation of fl-DA/DDA Polyimide(4)

In a dry 250 ml round bottom flask equipped with a mechanical stirrer and N₂ inlet, a solution of 2,3,5,6-tetramethyl-1,4-phenylene diamine, (DDA) (2.444 g, 0.01488 mol) in dimethylacetamide (10 ml) was prepared. The flask was cooled to ca. 5° C. in an ice bath, the solution was stirred slowly and fl-DA (6.831 g, 0.01490 mol) was added in four portions during 50 min. Each addition resulted in a mild exotherm. The flask walls were rinsed with dimethylacetamide (18 ml) and the entire reaction apparatus was tilted and rotated to ensure that all solute was in solution. The reaction mixture was warmed to ambient temperature. After 4 hours, the 26% solute solution became highly viscous and after 40 hours, the viscosity was so high that stirring stopped.

The resulting polyamic acid solution was diluted with dimethyl acetamide (120 ml) treated with triethylamine (5.0 ml, 3.6 g, 36 mmol) and Ac₂O (15 ml, 16 g, 160 mmol) and warmed with stirring to 85° C. for 6 hours. The resulting polyimide solution was slowly poured into methanol (250 ml) while vigorously stirring in a blender thus precipitating the polymer and chopping it into small strands. The polyimide was collected on a glass frit, briefly dried in air, dissolved in dimethylacetamide (10–20 wt % solution) and again precipitated into methanol. The twice precipitated polymer was dried overnight at 100°+/−5°C. and 50 micron Hg pressure. Intrinsic viscosity, (25° C., DMAc)=0.81 dL/g. IR(KBr) 3064w, 2960w, 2931w, 1782s, 1721vs, 1620m, 1468s, 1451s, 1432s, 1381s, 1351vs, 1288m, 1267m, 1248s, 1180w, 1036m, 1016s, 943w, 919w, 884w, 860m, 846sh, 764m, 742 vs, 695m, 657m cm−1.

Preparation of fl-DA/DDA Polyimide Films

Runs 1 through 7, summarized in the Table, disclose films made from the following procedure. A 10 wt % polymer solution was prepared in dimethylacetamide. The solution was heated in order to assist the dissolving of the polymer into the solution. The solution was then filtered through a 10 micron frit to remove particulate matter. Approximately 20 grams of solution was poured into a 110 cm glass ring on a glass plate and warmed to 200° C. under vacuum during twenty-four hours. Each respective film was removed from the plate and put into another vacuum oven set at 250° C. for forty-eight hours. The dried films according to Runs 1 through 7 were kept in a desiccator prior to mounting in a Linde permeability cell. The technique for measuring permeability is well known in the art and is disclosed in ASTM test method D1434-82. Pure nitrogen at a feed pressure of 10–50 psig was permeated through the membrane whose permeate side was maintained at one atmosphere. Following three days of equilibrating the nitrogen permeability measurements were taken for each film. The system was then purged with oxygen and allowed to equilibrate again before taking the oxygen permeability measurements. The Table discloses the oxygen permeability, nitrogen permeability and selectivity results for Runs 1 through 7.

TABLE

PERMEABILITY AND SELECTIVITY DATA FOR fl-DA/DDA POLYIMIDE FILMS

| Run | P(O$_2$) Centibarrers | P(N$_2$) Centibarrers | α Selectivity |
|---|---|---|---|
| 1 | 6895 | 1443 | 4.78 |
| 2 | 5345 | 1001 | 5.34 |
| 3 | 7800 | 1586 | 4.92 |
| 4 | 7042 | 1506 | 4.68 |
| 5 | 6712 | 1424 | 4.71 |
| 6 | 3608 | 1190 | 3.03 |
| 7 | 6337 | 1272 | 4.98 |
| Average (Runs 1–7) | 6248 +/− 1382 | 1346 +/− 203 | 4.63 +/− 0.74 |

A centibarrer is the number of cubic centimeters of gas passed by the membrane at standard temperature and pressure times the thickness of the membrane in centimeters times $10^{-12}$ divided by the permeating area of the membrane in square centimeters times the time in seconds times the partial pressure difference across the membrane in cmHg., i.e., $$\text{CentiBarrer} = 10^{-12} \frac{\text{cm}^3(\text{STP})(\text{cm})}{\text{cm}^2(\text{sec})(\text{cm Hg})}$$

The Table demonstrates that the membranes prepared from the polyimides according to the present invention provide significantly improved bulk permeability and selectivity compared to the membranes disclosed in U.S. Pat. Nos. 4,705,540, 4,717,393 and 4,717,394.

Various additional polyimide polymers were prepared according to the procedures disclosed herein wherein the diamines para-phenylene diamine, mesitylene diamine, methylene dianiline and 2,2-bis-(3-amino-4-methylphenyl) hexafluoropropane were used in place of DDA. The polyimides obtained therefrom were of insufficient molecular weight to cast self-supporting films.

Having thus described the present invention, what is now deemed appropriate for Letters Patent is set out in the following appended claims.

What is claimed is:

1. A semi-permeable membrane formed from a polyimide obtained by the reaction of a 9,9-bis-(3,4-dicarboxyphenyl)fluorene represented by the formula:

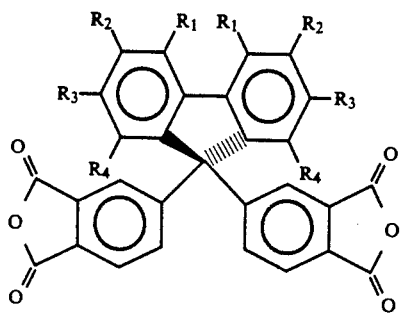

wherein R$_1$ through R$_4$, inclusive, are independently selected from a hydrogen atom, a linear or branched alkyl, alkenyl or alkoxy group having form 1 to about 8 carbon atoms, cyano or R$_1$ and R$_1'$, R$_1$ and R$_2$, R$_2$ and R$_3$, and R$_3$ and R$_4$ may together form part of cyclohydrocarbyl ring;

and an aromatic diamine represented by the formulae:

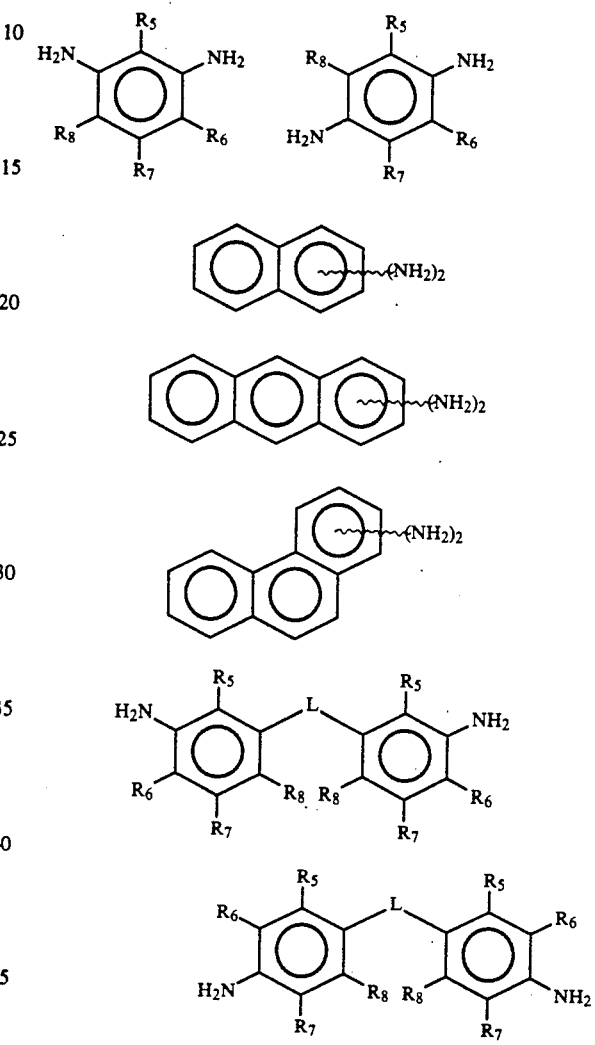

wherein R$_5$ through R$_8$, inclusive, are independently selected from a hydrogen atom or a linear or branched alkyl, alkenyl or alkoxy group having from 1 to about 8 carbon atoms, each of which can optionally be partially or fully fluorinated; and L is a linear or branched alkylene, alkenylene, phenylene or alkylphenylene group having from 1 to about 8 carbon atoms, each of which can optionally be partially or fully fluorinated.

2. The semi-permeable membrane according to claim 1 wherein

R$_5$ through R$_8$, inclusive, are independently selected from a hydrogen atom or a linear or branched alkyl, alkenyl or alkoxy group having from 1 to about 8 carbon atoms; and L is a linear or branched alkylene, alkenylene, phenylene or alkylphenylene group having from 1 to about 8 carbon atoms.

3. The semi-permeable membrane according to claim 1 wherein $R_5$ through $R_8$, inclusive, are independently selected from a hydrogen atom or a partially or fully fluorinated linear or branched alkyl, alkenyl or alkoxy group having from 1 to about 8 carbon atoms; and L is a partially or fully fluorinated linear or branched alkylene, alkenylene, phenylene or alkylphenylene group having from 1 to about 8 carbon atoms.

4. The semi-permeable membrane according to claim 1 wherein $R_5$ through $R_8$, inclusive, are independently selected from a hydrogen atom or a linear or branched alkyl group having from 1 to about 8 carbon atoms.

5. The semi-permeable membrane according to claim 4 wherein L is selected from a linear or branched alkylene group having from 1 to about 6 carbon atoms, each of which can optionally be partially or fully fluorinated.

6. The semi-permeable membrane according to claim 1 wherein $R_5$ through $R_8$, inclusive, are independently selected from a hydrogen atom or a partially or fully fluorinated linear or branched alkyl group having from 1 to about 8 carbon atoms.

7. The semi-permeable membrane according to claim 5 wherein L is selected from a linear or branched alkylene group having from 1 to about 6 carbon atoms, each of which can optionally be partially or fully fluorinated.

8. A semi-permeable membrane formed from a polyimide obtained by the reaction of 9,9-bis-(3,4-dicarboxyphenyl)fluorene and an aromatic diamine represented by the formulae:

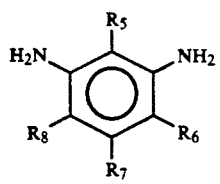
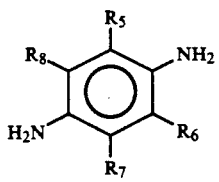
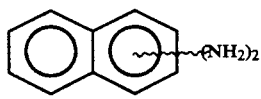
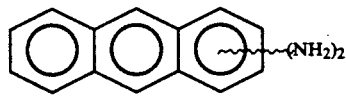
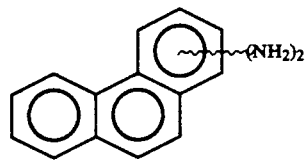
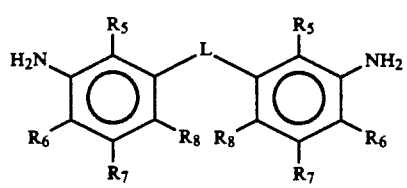
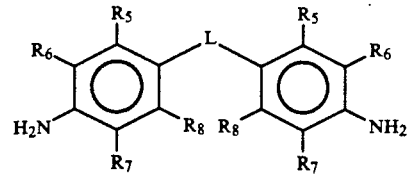

wherein $R_5$ through $R_8$, inclusive, are independently selected from a hydrogen atom or a linear or branched alkyl, alkenyl or alkoxy group having from 1 to about 8 carbon atoms, each of which can optionally be partially or fully fluorinated; and L is a linear or branched alkylene, alkenylene, phenylene or alkylphenylene group having from 1 to about 8 carbon atoms, each of which can optionally be partially or fully fluorinated.

9. The semi-permeable membrane according to claim 8 wherein $R_5$ through $R_8$, inclusive, are independently selected from a hydrogen atom or a linear or branched alkyl, alkenyl or alkoxy group having from 1 to about 8 carbon atoms; and L is a linear or branched alkylene, alkenylene, phenylene or alkylphenylene group having from 1 to about 8 carbon atoms.

10. The semi-permeable membrane according to claim 8 wherein $R_5$ through $R_8$, inclusive, are independently selected from a hydrogen atom or a partially or fully fluorinated linear or branched alkyl, alkenyl or alkoxy group having from 1 to about 8 carbon atoms; and L is a partially or fully fluorinated linear or branched alkylene, alkenylene, phenylene or alkylphenylene group having from 1 to about 8 carbon atoms.

11. The semi-permeable membrane according to claim 8 wherein $R_5$ through $R_8$, inclusive, are independently selected from a hydrogen atom or a linear or branched alkyl group having from 1 to about 8 carbon atoms.

12. The semi-permeable membrane according to claim 11 wherein L is selected from a linear or branched alkylene group having from 1 to about 6 carbon atoms, each of which can optionally be partially or fully fluorinated.

13. The semi-permeable membrane according to claim 8 wherein $R_5$ through $R_8$, inclusive, are independently selected from a hydrogen atom or a partially or fully fluorinated linear or branched alkyl group having from 1 to about 8 carbon atoms.

14. The semi-permeable membrane according to claim 12 wherein L is selected from a linear or branched alkylene group having from 1 to about 6 carbon atoms, each of which can optionally be partially or fully fluorinated.

15. A semi-permeable membrane formed from a polyimide containing polymerizable units of the formula:

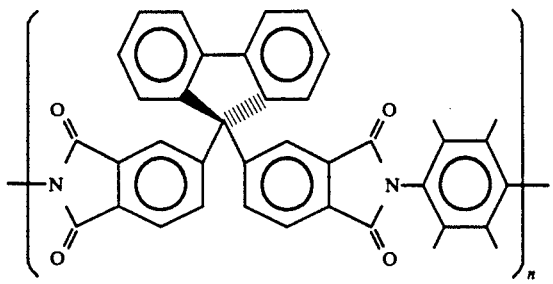

16. A process for separating a component of a gas mixture containing at least one other component, said process comprising: bringing said gas mixture into contact with the membrane of claim 1 whereby one component selectively permeates through said membrane.

17. The process according to claim 16 wherein the gas mixture is air and oxygen selectively permeates through the membrane.

18. The process according to claim 16 wherein the gas mixture contains nitrogen and oxygen.

19. A process for separating a component of a gas mixture containing at least one other component, said process comprising: bringing said gas mixture into contact with the membrane of claim 8 whereby one component selectively permeates through said membrane.

20. The process according to claim 19 wherein the gas mixture is air and oxygen selectively permeates through the membrane.

21. The process according to claim 19 wherein the gas mixture contains nitrogen and oxygen.

22. A process for separating a component of a gas mixture containing at least one other component, said process comprising: bringing said gas mixture into contact with the membrane of claim 15 whereby one component selectively permeates through said membrane.

23. The process according to claim 22 wherein the gas mixture is air and oxygen selectively permeates through the membrane.

24. The process according to claim 22 wherein the gas mixture contains nitrogen and oxygen.

* * * * *

UNITED STATES PATENT AND TRADEMARK OFFICE
CERTIFICATE OF CORRECTION

PATENT NO. : 5,009,679

DATED : April 23, 1991

INVENTOR(S) : Angus et al.

It is certified that error appears in the above-identified patent and that said Letters Patent is hereby corrected as shown below:

Column 9, line 26, "claim 5" should be -- claim 6 --.

Column 10, line 62, "Claim 12" should be -- claim 13 --.

Signed and Sealed this

Sixth Day of October, 1992

*Attest:*

DOUGLAS B. COMER

*Attesting Officer*     *Acting Commissioner of Patents and Trademarks*